Patented Sept. 12, 1944

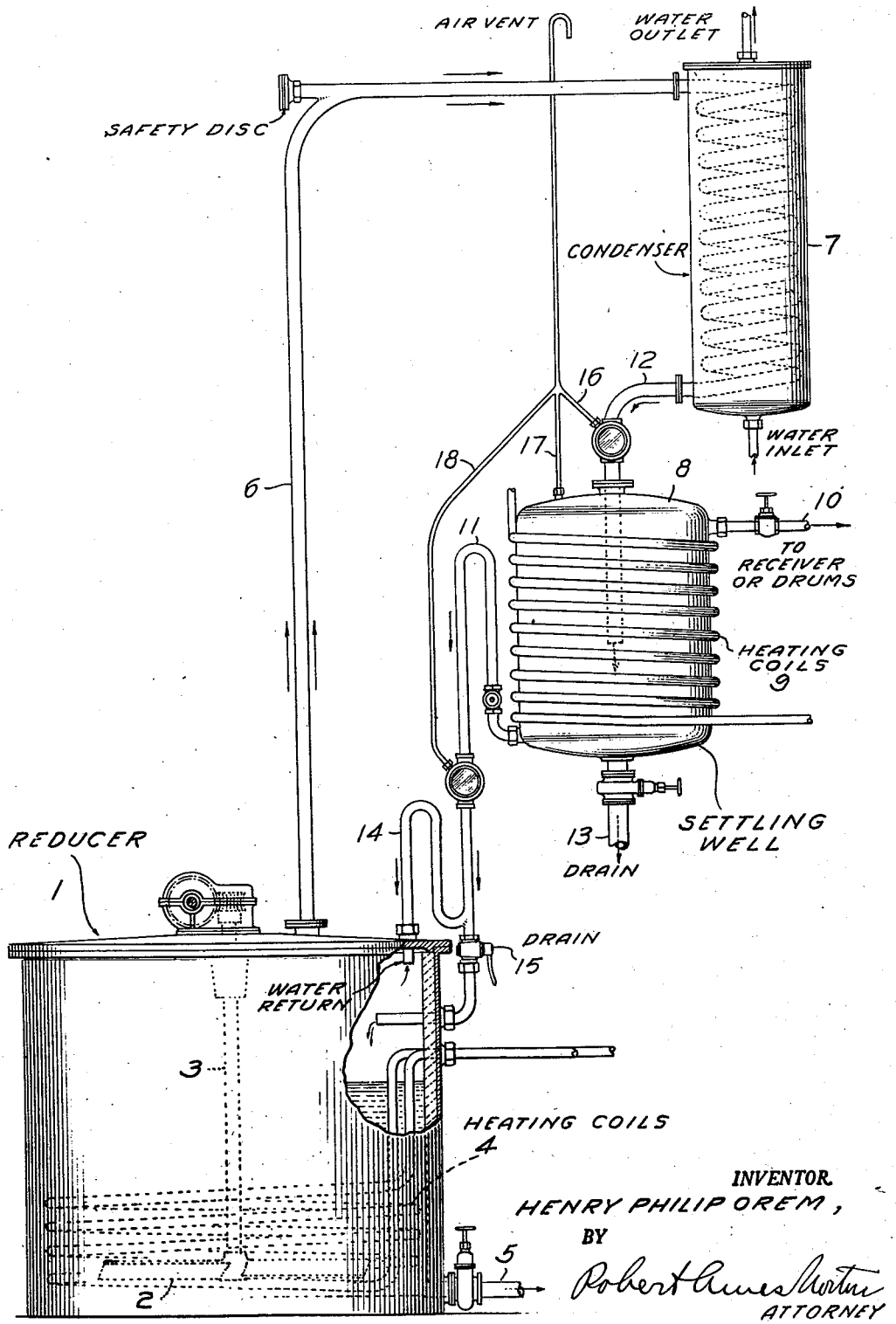

2,358,182

UNITED STATES PATENT OFFICE 2,358,182

METHOD OF DISTILLING ANILINE

Henry Philip Orem, North Plainfield, N. J., assignor to American Cyanamid Company, New York, N. Y., a corporation of Maine Application March 27, 1942, Serial No. 436,427

2 Claims. (Cl. 202—46)

This invention relates to a method of purifying aniline.

Aniline is usually produced by the reduction of nitrobenzene and the crude product contains some impurities. It is customary to recover the aniline by azeotropic distillation in the presence of steam. This may be effected either by heating the reaction mixture containing aniline, water and iron oxide sludge or by blowing steam therethrough. In either event, vapors are obtained which contain a mixture of aniline and steam. It is found that as long as the amount of aniline in the reaction is at least 7% based on the water content, the percentage of aniline in the vapor is between 19 and 20% at ordinary pressure. When the percentage of aniline in the reaction mixture falls below 7% the percentage of aniline in the vapor form gradually decreases but still remains considerably greater than the percentage of aniline in the liquid form.

It is customary to condense the aniline-steam mixture and to separate it into two layers, one of aniline containing dissolved therein a small amount of water and the other water containing a small amount of aniline. At room temperature the aniline layer is heavier than the water layer, but only slightly so and considerable difficulties are encountered in obtaining a sharp and clean separation and there is quite a material loss of aniline in the water layer.

The present invention is based on the distillation of aniline in the presence of water vapor and condensing the vapors and then separating at an elevated temperature a little below the boiling point of water, for example about 90° C. At this temperature a reversal of specific gravity takes place, the aniline layer becoming lighter than the water layer and a sharp separation into two layers is effected.

In spite of the sharp separation obtainable and the other advantages at first glance it might be thought that the process of the present invention would be unsuitable because the amount of aniline dissolved in the water layer is higher at the higher temperature, varying from about 6% at 80° C. to about 7% at 99° C. However, this apparent loss is limited by the fact that the present invention permits returning the water layer to the still and redistilling. It is possible by using the present invention to recover up to 98% of the aniline in a crude reaction mixture. The limit to recovery is set by the concentration of aniline in the reaction mixture which will give vapors having more than 6 or 7% of aniline and thus condensing to form two layers. This point is reached between about 1½% of aniline and 2% in the still as will be apparent from the following table which shows the aniline percentages in liquid and vapor when an aniline water mixture is distilled at 99.1 to 99.8° C. at atmospheric pressure.

| Percent in liquid | Percent in vapor | Percent in liquid | Percent in vapor |
|---|---|---|---|
| 0.0 | 0.00 | 4.5 | 15.05 |
| 0.5 | 2.50 | 5.0 | 16.05 |
| 1.0 | 4.60 | 5.5 | 17.00 |
| 1.5 | 6.55 | 6.0 | 17.90 |
| 2.0 | 8.40 | 6.5 | 18.65 |
| 2.5 | 10.00 | 7.0 | 19.35 |
| 3.0 | 11.35 | 7.1 | 19.50 |
| 3.5 | 12.75 | | |
| 4.0 | 13.95 | | |

It is not economically desirable to recover more than 98% of the aniline as the cost of removing the last quarter to half percent is not justified.

The present invention is not limited to any particular apparatus, and it is an advantage that standard pieces of apparatus may be employed, the only difference being that the settling well must be piped so that the overflow goes to product and the under-flow is returned to the still instead of the contrary. A typical installation is shown in the drawing which is an elevation partly broken away of a large scale plant. The invention is not restricted to any of the structural details shown which are merely illustrative of a typical plant in which the process can be carried out.

In the drawing a reducer or reaction vessel 1 is shown provided with a stirrer 2 rotated by a shaft 3. In this reaction vessel the reduction of nitrobenzene to aniline is carried out in a batch method as is conventional. When the reaction is complete, the mixture contains aniline, iron oxide sludge, and water, the proportions of aniline ranging from about 17 to 30%. Heat is applied through the heating coils 4, for example by using low pressure steam, and azeotropic distillation commences. Vapors of aniline and water in the proportion of about 1 part of aniline to 4 parts of steam pass through the pipe 6. The temperature is preferably maintained between 90 and 100° C.

The aniline and steam mixture is then passed through the water-cooled condenser 7 and condensed into a liquid which flows through the pipe 12 to a settling well 8 which is maintained at about 90° C. by the heating coil 9. The liquid separates rapidly and sharply into two layers, an upper layer of aniline containing a small amount of water in solution which passes off through the valved pipe 10 and a lower layer of water containing from 6 to 7% of aniline passes up through the valved trap 11, then down through the trap 14 into the still where it is redistilled. The pipe 12, settling well 8 and traps 11 and 14 are vented by the air vents 16, 17 and 18 respectively and suitable valved drain pipes 13 and 15 are provided for draining the settling well and the trap 14, respectively. Distillation is continued until about 98% of the aniline is recovered at which time the operation is stopped and the slurry of iron oxide discharged from the reaction vessel 1 through the valved pipe 5, if necessary after further dilution with water.

The aniline from the settling well may be used as such where anhydrous aniline is not necessary or it may be subjected to suitable fractional distillation to remove the water content as is conventional in the art.

I claim:

1. In a method of distillation of aniline in which aniline is vaporized in the presence of water to produce a mixture of aniline and steam, the vapors are condensed to liquids and the two liquids separated by gravity separation, the improvement which comprises maintaining condensed aniline and water at a sufficiently elevated temperature so that they separate into two sharp layers, the water layer being heavier than the aniline layer, separating the layers and returning the water layer to the aniline being vaporized.

2. A method according to claim 1 in which the temperature of the gravity separation operation is maintained at approximately 90° C.

HENRY PHILIP OREM.